United States Patent
Takano et al.

[11] Patent Number: 6,052,500
[45] Date of Patent: Apr. 18, 2000

[54] OPTICAL WAVEGUIDE DEVICE FOR CONNECTIONS WITHOUT OPTICAL AXIS ADJUSTMENT

[75] Inventors: Toshihiro Takano; Michio Ohba; Yasunari Kawabata, all of Tokyo, Japan

[73] Assignee: Mitsubishi Gas Chemical Company, Inc., Japan

[21] Appl. No.: 08/980,815

[22] Filed: Dec. 1, 1997

[30] Foreign Application Priority Data

Dec. 3, 1996 [JP] Japan .................................. 8-322867

[51] Int. Cl.$^7$ ...................................................... G02B 6/26
[52] U.S. Cl. ................................ 385/50; 385/52; 385/137
[58] Field of Search ................................ 385/49, 50, 52, 385/137

[56] References Cited

U.S. PATENT DOCUMENTS

| | | | |
|---|---|---|---|
| 4,729,618 | 3/1988 | Yoshida et al. | 350/96.11 |
| 5,091,986 | 2/1992 | Arii et al. | 385/48 |
| 5,241,612 | 8/1993 | Iwama | 385/74 |
| 5,361,382 | 11/1994 | Nakamura et al. | 385/49 |
| 5,488,678 | 1/1996 | Taneya et al. | 385/14 |
| 5,604,830 | 2/1997 | Kuder et al. | 385/59 |

FOREIGN PATENT DOCUMENTS

| | | |
|---|---|---|
| 0 716 321 | 11/1995 | European Pat. Off. . |
| 0 687 925 | 12/1995 | European Pat. Off. . |
| 0 716 321 | 6/1996 | European Pat. Off. . |
| 4 402 422 | 9/1994 | Germany . |

*Primary Examiner*—John D. Lee
*Assistant Examiner*—Victoria D. Hao
*Attorney, Agent, or Firm*—Wenderoth Lind & Ponack, L.L.P.

[57] ABSTRACT

An optical device which can be fabricated without any axial alignment by optical measurement and can therefore be produced at a remarkably decreased cost, and which is composed of an optical waveguide part (1) obtained by perpendicularly cutting an optically-transparent polymer film having a glass substrate attached thereto and having a refractive index distribution formed, in a predetermined position measured from the position of the refractive index distribution as a reference, and a holder part (2) for holding the optical waveguide part (1) in a predetermined position, the holder part (2) having a horizontal guide surface (2H) and a vertical guide surface (2V), the optical waveguide part (1) having a glass substrate surface or a polymer film surface coherently attached to the horizontal guide surface (2H) of the holder part (2), and the optical waveguide part (1) having a perpendicularly cut surface coherently attached to the vertical guide surface (2V) of the holder part (2).

5 Claims, 3 Drawing Sheets

OPTICAL WAVEGUIDE DEVICE FOR CONNECTIONS WITHOUT OPTICAL AXIS ADJUSTMENT

FIELD OF THE INVENTION

The present invention relates to the structure of an optical waveguide type optical device for use in an optical branching and coupling device and an optical receiver and transmitter module. More specifically, it relates to an optical device connectable with an optical fiber array without optical axis adjustment based on optical measurement.

PRIOR ART

The application of optical parts such as an optical branching and coupling device and an optical receiver and transmitter module is rapidly broadening in use range with broadening fields of telecommunication, data processing and image processing. It is therefore being demanded to improve their performance and decrease their price. In particular, at present, the application of these optical parts is considered difficult in many cases since they are expensive. For increasing the use thereof in the future, it is considered the most important key to decrease their production costs for decreasing their prices.

For example, the production steps of conventional optical waveguide type optical branching and coupling device are outlined as follows. That is, the optical waveguide type optical branching and coupling device is produced by the step of fabricating an optical waveguide part by sandwiching a polymer film, on which a predetermined optical waveguide is formed, between two substrates to reinforce it and finishing end surfaces of the optical waveguide, the step of fabricating an optical fiber array by arraying optical fibers so as to be in agreement with a waveguide pitch in an optical waveguide end portion, and the step of placing the above optical waveguide part and the optical fiber array face to face on an optical stage, fine-tuning the relative positions of the optical fiber array and the optical waveguide part while passing light through these two and joining the optical waveguide part and the optical fiber array to each other in positions where the maximum intensity of transmitted light is obtained.

Of the above steps, the optical axes adjustment step of adjusting the relative positions of the optical waveguide part and the optical fiber array to optimum positions and joining these two to each other, i.e., the axial alignment step, requires measuring instruments such as an optical stage, a light source and an optical power meter, a long period of time and a large volume of labor, and this step is the greatest factor that increases the production cost of the optical devices.

For producing the optical waveguide type optical device at a remarkably low cost, the present inventors have considered it indispensable to produce an optical waveguide type optical device without the step of the above axial adjustment. The present inventors have therefore made diligent studies to find out the structure of an optical waveguide part and the constitution of an optical device for joining the optical waveguide part and an optical fiber array to each other in optimum positions.

As a result, it has been found that the above object can be achieved by providing a holder part having guide surfaces (or guide holes) for holding or binding both an optical waveguide part and an optical fiber array in a predetermined position and precisely cutting the optical waveguide part such that the relative positions of the optical waveguide and the holder part are constant at the time of holding the optical waveguide part. The present invention has been accordingly completed on the above finding.

SUMMARY OF THE INVENTION

It is an object of the present invention to provide an optical device which permits the adjustment of relative positions of an optical waveguide part and an optical fiber array with ease at a low cost.

According to the present invention, there is provided an optical device composed of an optical waveguide part (1) obtained by perpendicularly cutting an optically-transparent polymer film having a glass substrate attached thereto and having a refractive index distribution formed, in a predetermined position measured from the position of the refractive index distribution as a reference, and a holder part (2) for holding the optical waveguide part (1) in a predetermined position, the holder part (2) having a horizontal guide surface (2H) and a vertical guide surface (2V), the optical waveguide part (1) having a glass substrate surface or a polymer film surface coherently attached to the horizontal guide surface (2H) of the holder part (2), and the optical waveguide part (1) having a perpendicularly cut surface coherently attached to the vertical guide surface (2V) of the holder part (2).

DETAILED DESCRIPTION OF THE INVENTION

In the present invention, preferably, as the optically-transparent polymer film having a glass substrate attached thereto and having a refractive index distribution formed, there is used a film produced by the steps of forming an optically-transparent polymer film containing a photo-polymerizable monomer on a glass substrate, irradiating the polymer film selectively with ultraviolet light to polymerize the photo-polymerizable monomer in an exposed portion to solidness, and drying the formed polymer film while maintaining the adhesion of the polymer film to the glass substrate and removing unreacted photo-polymerizable monomer to obtain a polymer film having a glass substrate attached thereto and having a refractive index distribution formed.

When the optical device is used mainly in the wavelength region from visible light to near infrared light, the optical device has the following features. The optically-transparent polymer is a polycarbonate resin from 1,1-bis(4-hydroxyphenyl)cyclohexane, the photo-polymerizable monomer is an acrylate-containing monomer, the holder part (2) has guide holes or guide surfaces for joining an optical fiber array, which is to be coupled with the optical waveguide part (1), to a predetermined position, further, the holder part (2) has a pair of facing vertical guide surfaces, the distance between the vertical guide surfaces is in agreement with the cut width of the optical waveguide part (1) in a cross section prependicular to the optical waveguide, and when the distance between the vertical guide surfaces of the holder part (2) is W and when the cut width of the optical waveguide part (1) in the cross section perpendicular to the optical waveguide is C, W-C is in the range of 0<W-C≦10 μm.

The present invention will be explained in detail with reference to drawings hereinafter.

Figure 1:
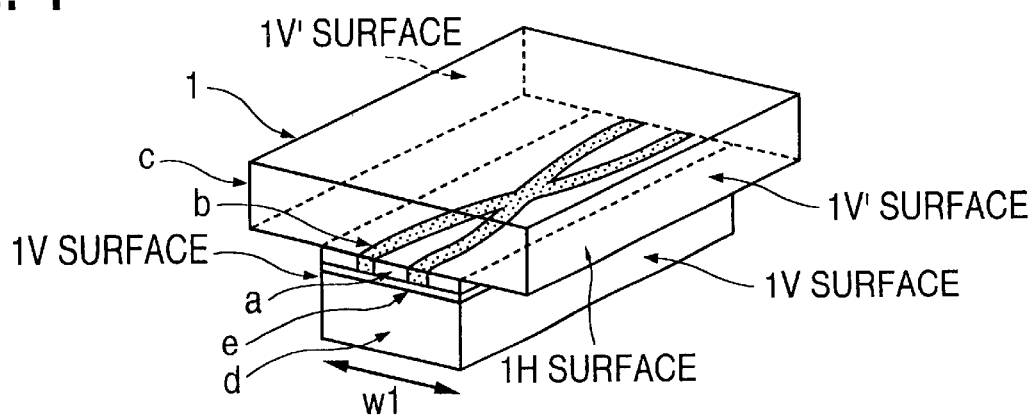
FIG. 1 is a perspective view of one example of the optical waveguide part in the present invention.

FIG. 1 is a perspective view of one example of the optical waveguide part in the present invention, viewed from the optical waveguide end surface.

Figure 2:
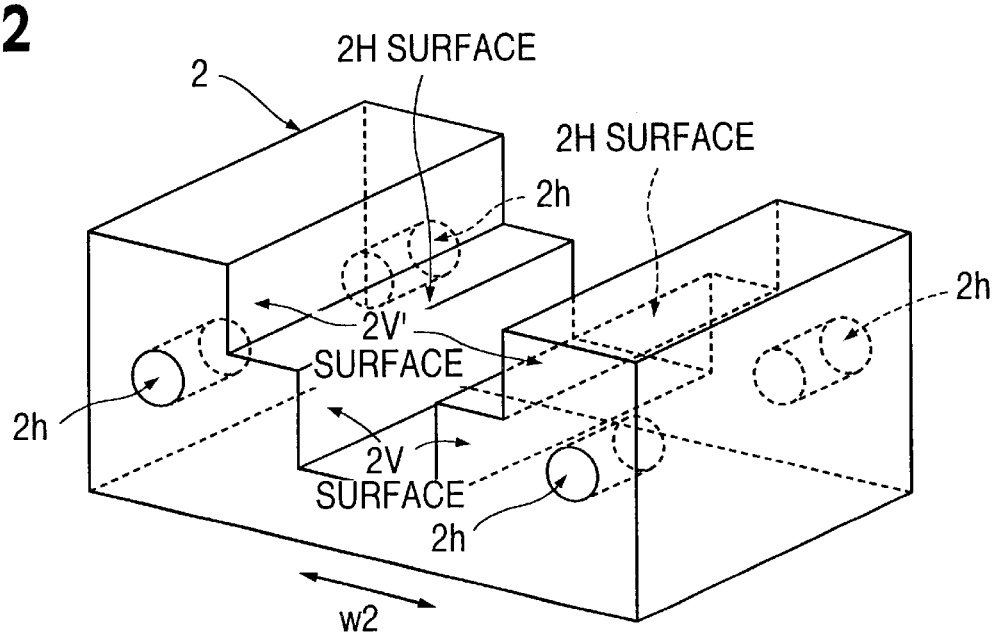
FIG. 2 is a perspective view of one example of the holder part corresponding to the optical waveguide part shown in FIG. 1.

FIG. 2 is a perspective view of one example of the holder part corresponding to the optical waveguide part shown in FIG. 1.

In FIG. 1, an optical waveguide part 1 has a structure in which a waveguide film a is sandwiched between two glass substrates c and d. The waveguide film a is in direct contact with the glass substrate c and bonded to the glass substrate d with an adhesive.

The waveguide part 1 is vertically precisely cut from the glass substrate d side with the position of an optical waveguide b (portion having a high refractive index) being a reference, and the waveguide part 1 has a pair of facing vertical surfaces 1V formed. The distance between these vertical surfaces is w1. The glass substrate c is cut so as to have a breadth (cut surfaces 1V') greater than that of the glass substrate d. Part of that surface of the glass substrate c which is on the waveguide film side is exposed and forms a horizontal surface 1H.

In FIG. 2, the height difference portion within the holder part 2 has the form of a replica of the optical waveguide part 1. The holder part 2 has a pair of facing vertical guide surfaces 2V and a pair of horizontal guide surfaces 2H. The distance w2 between the facing vertical guide surfaces 2V is formed so as to be a little greater than the above w1, and these guide surfaces are coherently attached to the vertical surfaces 1V and the horizontal surfaces 1H of the optical waveguide part 1, so that the optical waveguide part 1 is held in a predetermined position.

Another pair of vertical surfaces 2V' within the holder are not required to be precisely fabricated. It is sufficient that the vertical surfaces 1V' of the glass substrate c which is cut should be held therein.

Further, through each end surface of the holder part, a pair of guide holes 2h are formed for joining an optical fiber array, which is to be coupled with the optical waveguide, to a predetermined position. This is an effective connection method when a pair of guide holes are provided in predetermined positions of an optical fiber array like an MT connector. The guide holes are used for precision positioning by connecting corresponding guide holes with guide pins.

As explained above, the present invention has features in that guides for holding or joining the optical waveguide part and an optical fiber array to a predetermined position are provided in the structure of the holder part whereby an optical device using an optical waveguide can be produced without axial alignment based on optical measurement.

The processing accuracy that is to be required will be discussed below.

For example, for an optical device for an optical fiber having a core diameter of 50 μm, which is generally widely used as a multi-mode optical fiber, it is considered that the positioning accuracy of 10 μm or less, preferably 5 μm or less, is at least required.

Concerning a lateral direction viewed from the waveguide cross section side as shown in FIG. 1, it is a pre-condition to precisely cut the waveguide part in a predetermined position with the position of the waveguide being a reference.

Secondly, the relationship between the distance w2 from one vertical guide surface to the other of the holder part and the corresponding distance w1 from one vertical surface to the other of the optical waveguide part is important. The above relationship determines the positioning accuracy in a lateral direction viewed from the waveguide cross section side.

Therefore, in addition to the requirement of w1<w2 for holding the optical waveguide part in the holder part, it is an essential condition that the relationship of 0<w2-w1≦10 μm should be satisfied for accomplishing a desired accuracy.

Then, the positioning accuracy in a longitudinal direction viewed from the waveguide cross section side is obtained on the basis of a coherent attachment of the horizontal guide surfaces 2H and the horizontal surfaces 1H. Therefore, each surface is required to be flat, and it is required that no gap should caused by the adherence of foreign matter, and the like. Naturally, it is also required to precisely produce the guide holes 2H for joining an optical fiber array, which is to be coupled with the optical waveguide, to a predetermined position.

For accomplishing the above accuracy, it is required to precisely fabricate both the optical waveguide part and the holder part. For example, the former having a high precision can be obtained by precise cutting with a dicing machine or a slicing machine, and the latter having a high precision can be obtained by molding an epoxy resin containing a silica powder with a precision mold.

The above-explained example is for illustrating purpose, and the holder part corresponding to the waveguide part having the form shown in FIG. 1 can have various types and forms.

First, the vertical guide surface 2V and the horizontal guide surface 2H are not necessarily required to be flat over the entire surface each. The holder part may have a form in which the vertical guide surface 2V and the horizontal guide surface 2H are partly coherently attached to the vertical surface 1V and the horizontal surface 1H of the optical waveguide part. It is rather preferred in many cases that a dent portion is present in the guide surface, since the possibility of the positioning error occurring due to the adherence of a dust, etc., decreases, or since the dent portion can work as a reservoir for an adhesive when these parts are bonded and fixed to each other.

There may be employed a method in which the surface 2V' is used in place of the vertical guide surface 2V and the vertical surface 1V' of the optical waveguide part 1 is coherently attached thereto. In this case, it is required to precisely control the distance between the facing surfaces 2V' and the distance between facing surfaces 1V'. On the other hand, the distance accuracy between the 2V surfaces and the distance accuracy between 1V surfaces are no longer required.

Further, a pair of the above vertical guide surfaces are not so necessarily required as described above. There may be employed a method in which the corresponding vertical surface and the horizontal surface of the waveguide part 1 are coherently attached to one guide surface and one horizontal guide surface.

Further, concerning the guide for joining an optical fiber array, which is coupled with the optical waveguide, to a predetermined position, an optical fiber array whose outline is precisely fabricated like the optical waveguide part is used in place of a pair of the guide holes provided through each end surface shown in FIG. 2, for coherently attaching its guide surfaces.

Figure 3:
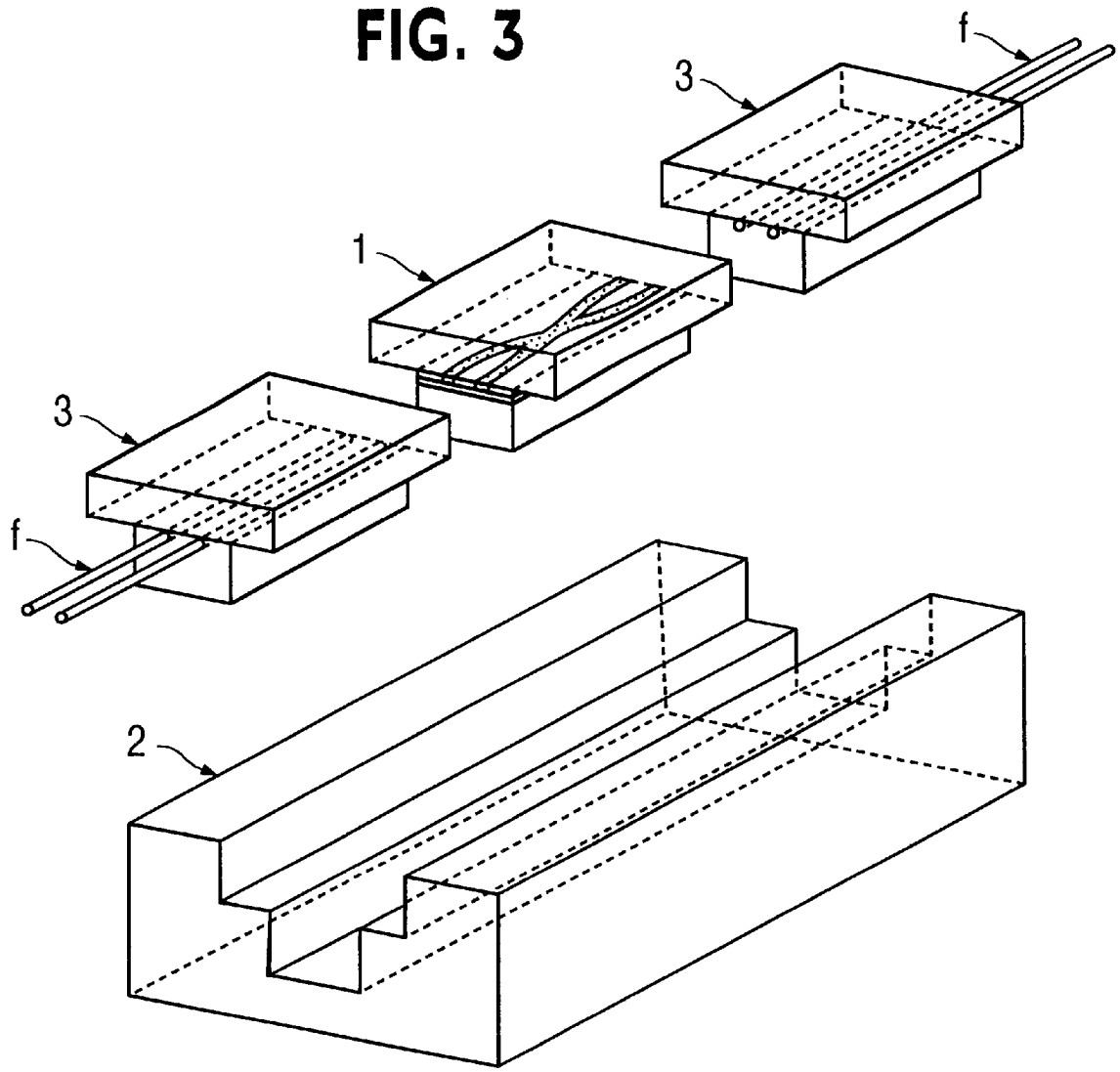
FIG. 3 is a perspective view of another example of the holder part corresponding to the optical waveguide part shown in FIG. 1 (including the optical waveguide part and two optical fiber arrays).

FIG. 3 shows one example in which optical fiber arrays (3) are also held in predetermined positions of the holder part on the basis of guide surfaces. In FIG. 3, f shows an optical fiber.

It is preferred to use an optical waveguide part which is produced as follows. An optically-transparent polymer film having a glass substrate attached thereto and having a refractive index distribution formed, is fabricated by the steps of forming a light-transmitting polymer film containing a photo-polymerizable monomer on a glass substrate, irradiating the polymer film selectively with ultraviolet light to polymerize the photo-polymerizable monomer in an exposed portion to solidness, and drying the formed polymer film while maintaining the adhesion of the polymer film to the glass substrate and removing unreacted photo-polymerizable monomer to obtain a polymer film having a glass substrate attached thereto and having a refractive index distribution formed. Then, another glass substrate is bonded to the other film surface to which the above glass substrate is not in contact, with an adhesive, and then the resultant set is cut, whereby an optical waveguide of the polymer film on the glass substrate is produced, and then, a final device is obtained by treatment without peeling the polymer film from the glass substrate.

The optical device of the present invention can be fabricated by a conventional method in which an optical waveguide film is formed in a casting container and the film is separated and bonded to substrates. In the conventional method, however, the film shrinks approximately by 3 or 4% when the formed film is separated from the container, and it is therefore difficult to precisely control the dimensional accuracy at the level of several micrometers. In contrast, in the method employed in the present invention, the film is not separated from the glass substrate, so that the dimensional accuracy of the film can be maintained to a degree equivalent to that of glass. Therefore, an optical waveguide part having remarkably high accuracy can be obtained.

The optically-transparent film containing a photo-polymerizable monomer is formed on a glass substrate by dissolving an optically-transparent polymer, a photo-polymerizable monomer and optionally a sensitizer in a solvent and spreading the solution on the glass substrate surface. Specifically, there can be employed any one of a doctor blade method, a spin coating method, a dipping method and a casting method in which the glass substrate is surrounded on its marginal portion so as to hold the solution on the glass substrate surface.

When the adhesion between the glass substrate and the polymer film is poor, the polymer film may peel off from the glass substrate during a period from the formation of the polymer film to the post processing. In this case, the glass substrate and the polymer film can be strongly bonded to each other by a method in which a groove for preventing the peeling is provided in a marginal portion of the glass substrate to be used or in that portion of the glass substrate which is apart from a region where a refractive index distribution is to be formed, or a method in which the glass substrate surface is modified with an organic silane treating agent having an effect on the improvement of affinity of a polymer as a film material and the glass.

EXAMPLES

The optical device of the present invention will be explained more in detail with reference to Examples hereinafter. The following Examples are intended for specific explanations, and shall not limit the working embodiment and the scope of the present invention.

Example 1 (8×8 optical star coupler device for 50 $\mu$m optical fiber)

(Photo-mask)

Figure 4:
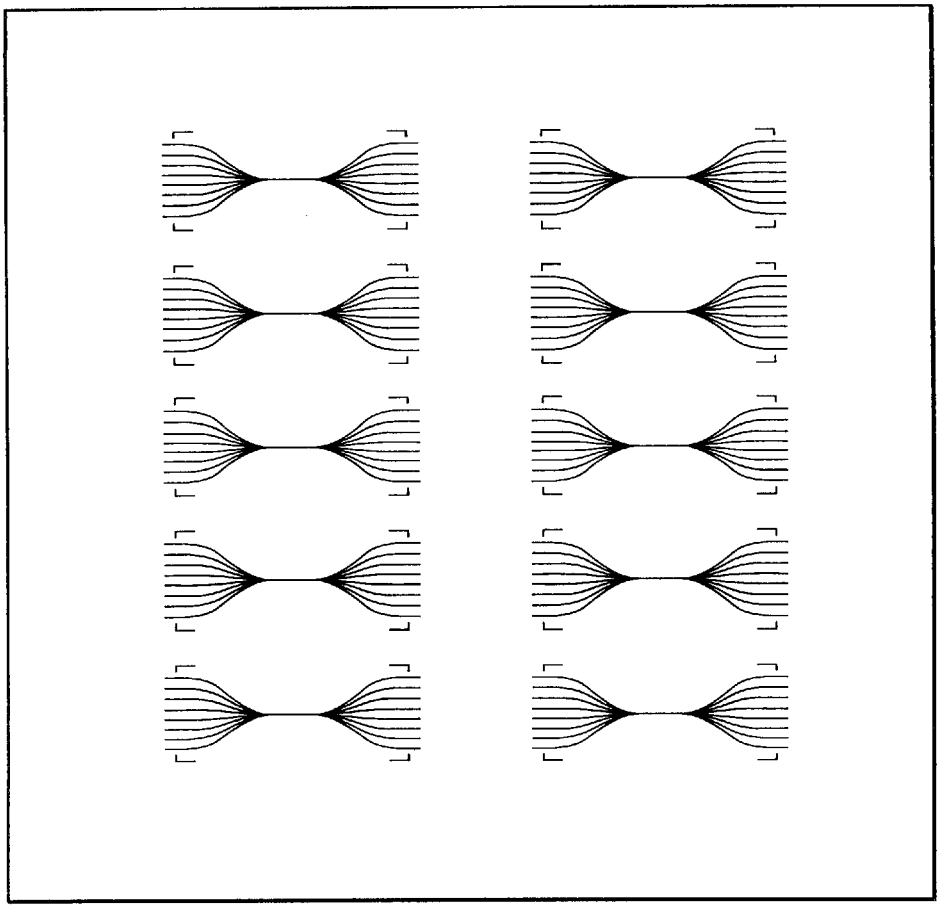
FIG. 4 is a plan view of a photo-mask pattern used in Example 1.

A photo-mask having a size of 127 mm×127 mm and having a pattern shown in FIG. 4 was used.

Figure 5:
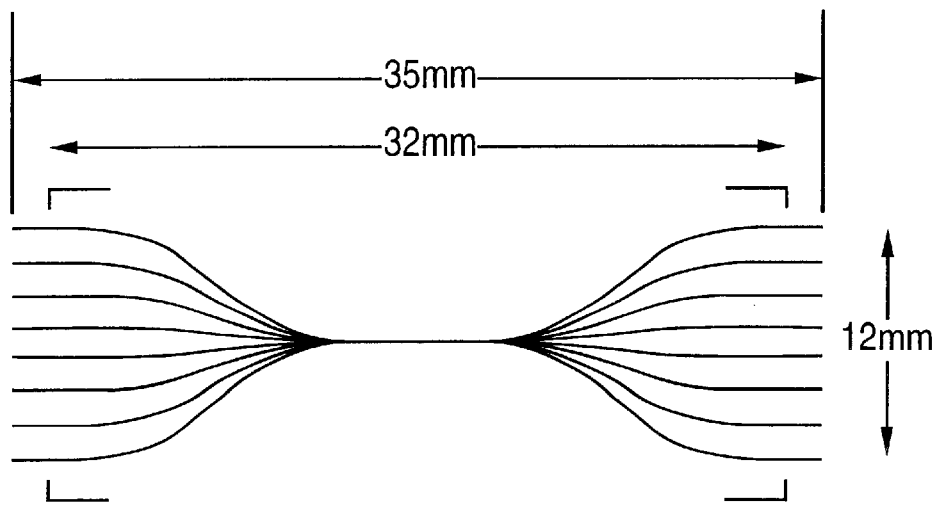
FIG. 5 is an enlarged view of part of the photo-mask pattern shown in FIG. 4.

The optical circuit of the photo-mask had a 8×8 branched waveguide pattern in which each waveguide in an end portion had a width of 40 $\mu$m and the pitch from a waveguide to an adjacent one was 250 $\mu$m. The detail thereof was as shown in FIG. 5.

(Pretreatment of glass substrate)

For improving the adhesion between a film to be formed and a glass substrate (c), a groove having a width of 0.5 mm and a depth of 0.7 mm was made on a glass substrate having a 15×15 cm size and a thickness of 1.1 mm in those portions which were 2 cm inside from four sides and were on sides of an 11 cm×11 cm area, with a dicing machine, to form a peel preventer.

(Fabrication of optical waveguide)

Predetermined amounts of a polycarbonate resin (Iupilon Z, supplied by Mitsubishi Gas Chemical Co., Inc.) synthesized from bisphenol Z, methyl acrylate as a photo-polymerizable monomer and benzoin ethyl ether as a sensitizer were dissolved in methylene chloride to prepare a solution, and the solution was applied to the above-grooved glass substrate by a doctor blade method. Then, the solution-applied glass substrate was moderately dried to remove the solvent.

Then, the above photo-mask was placed on a dry coating and the coating was exposed to ultraviolet light to polymerize the methyl acrylate monomer.

Thereafter, the methyl acrylate monomer on a non-exposed portion was removed by drying it under vacuum, to form a 40 $\mu$m thick polymer film having a non-exposed portion formed of a phase (refractive index 1.59) of polycarbonate alone and an exposed portion formed of a mixture phase (refractive index 1.56) of polycarbonate and polymethyl acrylate. The glass substrate and the polymer film in the region surrounded by the groove kept strongly bonded to each other during the above steps.

Then, another glass substrate (d) having a size of 15 cm×15 cm and a thickness of 1.1 mm and having no groove formed was bonded to the polymer film with an adhesive having a refractive index of 1.56, to form a structure in which the polymer film was sandwiched with the glass substrates.

(Cutting)

The polymer film containing many elements, sandwiched with the glass substrates, was cut with a dicing machine such that each element had a cross section as shown in FIG. 1, whereby optical waveguide parts were obtained. The above cutting was carried out from the glass substrate (d) side toward the glass substrate (c). In each waveguide part obtained by the cutting, the distance between cut surfaces 1V' was about 3.2 mm, the distance between cut surfaces 1V was precisely 2.4 mm (−0 to −5 $\mu$m), the optical waveguide length (in propagation direction) was 32 mm, and the positions of 8-port waveguides which were exposed on end surfaces were symmetric.

(Holder part)

Holder parts having a cross section shown in FIG. 2 were produced by molding an epoxy resin containing a silica powder. In each holder part, the distance between vertical surfaces 2V' was 3.3 mm, or a little greater than the width of the cut glass substrate (c), the distance between vertical surfaces 2V was 2.4 mm (+0 to +5 µm), or equivalent to the width of the cut glass substrate (d), and the distance between the two end surfaces was 32 mm, or the same as that of the waveguide length. Further, the flat central portion between the vertical surfaces 2V was provided with a 2 mmφ hole for injecting an adhesive.

Further, for adjusting the position of an optical fiber array, a pair of 0.7 mmφ holes having a distance of 4.6 mm from one to the other were provided in each of the end surfaces.

(Assembly)

The above waveguide part was fit to the holder part and coherently attached thereto, and then these parts were fixed to each other by injecting an adhesive from the back side of the hole in the center of the groove and curing it. Then, an adhesive was applied to the top portion of the waveguide part, and a cover plate was placed and fixed. Finally, each end surface was flattened by polishing, to obtain an optical device.

(Measurement of Insertion Loss)

The above optical device, i.e., 8×8 optical star coupler, was measured for an insertion loss as follows.

An LED light source having a wavelength of 0.85 pm was connected to an input port A of the 8×8 optical circuit with a 50/125 GI optical fiber and light-emitted, and light from output ports 1 to 8 of the optical circuit was directed to an optical power meter consecutively from one port to another with the same optical fiber, and each light intensity was measured. The light intensities were measured with the same way as described above about Input ports B to H.

Further, the LED light source was directly connected to the power meter with the same optical fiber not through the optical circuit, and the light intensity was measured. The measured intensity was used as the input light intensity into the optical circuit.

The insertion loss in each of the ports 1 to 8 was calculated on the basis of the following equation using the above measurement results.

Insertion loss (dB)=−10×Log (output light intensity/input light intensity)

Table 1 shows the measurement results.

MT connectors (see JIS C 5981) with eight 50/125 GI optical fibers arrayed at a pitch of 250 µm were connected to each end surface of the above optical waveguide device with guide pins, and the optical fibers from the connectors were directed to a light source or an optical power meter. Then, the measurement of insertion loss in each of the same ports as the above was carried out.

Table 2 shows the results.

TABLE 1

Insertion loss of 8 × 8 waveguide part (unit: dB)

| Output-port | Input-port | | | | | | | |
|---|---|---|---|---|---|---|---|---|
| | A | B | C | D | E | F | G | H |
| 1 | 10.90 | 10.35 | 11.28 | 10.87 | 11.09 | 11.10 | 11.27 | 10.68 |
| 2 | 10.63 | 10.58 | 11.28 | 11.30 | 11.88 | 11.23 | 11.05 | 11.10 |
| 3 | 11.32 | 11.04 | 11.26 | 10.63 | 10.87 | 10.22 | 11.42 | 11.06 |

TABLE 1-continued

Insertion loss of 8 × 8 waveguide part (unit: dB)

| Output-port | Input-port | | | | | | | |
|---|---|---|---|---|---|---|---|---|
| | A | B | C | D | E | F | G | H |
| 4 | 10.73 | 11.10 | 9.92 | 10.40 | 10.08 | 10.81 | 11.85 | 11.22 |
| 5 | 11.20 | 11.65 | 10.75 | 10.34 | 10.05 | 10.54 | 11.31 | 10.58 |
| 6 | 11.16 | 11.36 | 10.39 | 11.16 | 10.33 | 9.96 | 11.28 | 11.16 |
| 7 | 11.22 | 11.08 | 11.54 | 11.23 | 11.29 | 11.16 | 10.60 | 10.42 |
| 8 | 10.72 | 10.26 | 11.20 | 11.45 | 10.63 | 11.06 | 10.32 | 10.69 |

TABLE 2

Insertion loss in MT connector connection (unit: dB)

| Output-port | Input-port | | | | | | | |
|---|---|---|---|---|---|---|---|---|
| | A | B | C | D | E | F | G | H |
| 1 | 10.73 | 10.61 | 11.53 | 11.06 | 11.30 | 11.32 | 11.30 | 10.71 |
| 2 | 10.39 | 10.84 | 11.54 | 11.06 | 11.16 | 11.43 | 11.12 | 11.28 |
| 3 | 11.32 | 11.35 | 10.14 | 10.93 | 11.17 | 10.43 | 11.66 | 11.13 |
| 4 | 10.81 | 11.55 | 11.96 | 10.82 | 10.33 | 11.17 | 11.11 | 11.36 |
| 5 | 11.11 | 11.95 | 10.27 | 10.51 | 10.27 | 10.79 | 11.57 | 10.70 |
| 6 | 10.99 | 11.57 | 10.70 | 11.34 | 10.55 | 9.97 | 11.32 | 11.23 |
| 7 | 11.23 | 11.40 | 11.94 | 11.47 | 11.66 | 11.49 | 10.69 | 10.50 |
| 8 | 10.77 | 11.49 | 11.57 | 11.71 | 10.89 | 11.37 | 10.51 | 10.75 |

The above results show that the relative position accuracy of the optical waveguide part and the holder part of the fabricated optical device was sufficiently secured since the performance of the optical waveguide device connected through the MT connectors was maintained as it was.

[Effect of the Invention]

According to the method in the present invention, optical devices having high performances can be fabricated without any axial alignment by optical measurement. The omission of the axial alignment step greatly decreases the production cost of optical devices, and less expensive optical devices can be applied to a variety of fields of use.

What is claimed is:

1. An optical device without optical axis adjustment based on optical measurement, composed of an optical waveguide part (1) obtained by perpendicularly cutting an optically-transparent polymer film having a glass substrate attached thereto and having a refractive index distribution formed, in a predetermined position measured from the position of the refractive index distribution as a reference, and a holder part (2) for holding the optical waveguide part (1) in a predetermined position, the holder part (2) having a horizontal guide surface (2H) and a vertical guide surface (2V), the optical waveguide part (1) having a glass substrate surface or a polymer film surface coherently attached to the horizontal guide surface (2H) of the holder part (2), and the optical waveguide part (1) having a perpendicularly cut surface coherently attached to the vertical guide surface (2V) of the holder part (2), and wherein the holder part (2) has guide holes or guide surfaces for joining an optical fiber array, which is to be coupled with the optical waveguide part (1), to a predetermined position.

2. The optical device according to claim 1, wherein the optically-transparent polymer film having a glass substrate attached thereto and having a refractive index distribution formed is a product obtained by the steps of forming an optically-transparent polymer film containing a photo-polymerizable monomer on a glass substrate, selectively irradiating the polymer film with ultraviolet light to polymerize the photo-polymerizable monomer in an exposed portion to fix the photo-polymerizable monomer as a polymer, drying the polymer film while maintaining the adhesion of the polymer film to the glass substrate, and removing unreacted photo-polymerizable monomer, to form the optically-transparent polymer film having the glass substrate attached thereto and having the refractive index distribution formed.

3. The optical device according to claim 2, wherein the optically-transparent polymer is a polycarbonate resin from 1,1-bis(4-hydroxyphenyl)cyclohexane and the photo-polymerizable monomer is an acrylate-containing monomer.

4. The optical device according to claim 1, wherein the holder part (2) has a pair of facing vertical guide surfaces and the facing vertical guide surfaces have a distance from one vertical guide surface to the other, which distance is in agreement with a width, in a cross section perpendicular to the waveguide, of the waveguide part (1) which is obtained by cutting.

5. The optical device according to claim 4, wherein the optical device satisfies $0 < W-C \leq 10 \ \mu m$ in which W is a distance between the vertical guide surfaces of the holder part (2) and C is a width, in a cross section perpendicular to the waveguide, of the waveguide part (1) which is obtained by cutting.

* * * * *